US009581453B2

(12) United States Patent
Lacher

(10) Patent No.: US 9,581,453 B2
(45) Date of Patent: Feb. 28, 2017

(54) METHOD FOR MAKING AVAILABLE AT LEAST ONE POSITION INFORMATION ITEM ABOUT A PARKED MOTOR VEHICLE AND MOTOR VEHICLE

(71) Applicant: AUDI AG, Ingolstadt (DE)

(72) Inventor: Peter Lacher, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/910,911

(22) PCT Filed: Aug. 1, 2014

(86) PCT No.: PCT/EP2014/002131
§ 371 (c)(1),
(2) Date: Feb. 8, 2016

(87) PCT Pub. No.: WO2015/018513
PCT Pub. Date: Feb. 12, 2015

(65) Prior Publication Data
US 2016/0209218 A1    Jul. 21, 2016

(30) Foreign Application Priority Data

Aug. 9, 2013   (DE) .................. 10 2013 013 329

(51) Int. Cl.
*G01C 21/26*      (2006.01)
*G08G 1/005*      (2006.01)
(Continued)

(52) U.S. Cl.
CPC ............. *G01C 21/26* (2013.01); *G01S 19/13* (2013.01); *G08G 1/005* (2013.01); *G08G 1/127* (2013.01); *G08G 1/205* (2013.01); *G08G 1/207* (2013.01)

(58) Field of Classification Search
CPC combination set(s) only.
See application file for complete search history.

(56) References Cited

U.S. PATENT DOCUMENTS 6,650,999 B1    11/2003   Brust
9,258,532 B2 *   2/2016   Ozaki ............... G01C 21/3602
(Continued)

FOREIGN PATENT DOCUMENTS

CN    101739810     6/2010
DE    199 23 750    11/1999
(Continued)

OTHER PUBLICATIONS

International Search Report issued by the European Patent Office in International Application PCT/EP2014/002131.
(Continued)

*Primary Examiner* — Thomas Tarcza
*Assistant Examiner* — Edward J Pipala
(74) *Attorney, Agent, or Firm* — Henry M. Feiereisen LLC

(57) ABSTRACT

A method for making available at least one position information item about a parked motor vehicle is disclosed, wherein a detector device of the motor vehicle detects the motor vehicle driving into a multi-level parking garage, and as a result of the detection of the driving in, transmission of at least one current first position information item by the motor vehicle to a vehicle-external central data-processing device is triggered. Furthermore, in the case of reception of the first position information item by the central data-processing device of the at least one first position information item, this information item is stored by the central data processing device.

10 Claims, 3 Drawing Sheets

(51) Int. Cl.
    *G08G 1/00* (2006.01)
    *G01S 19/13* (2010.01)
    *G08G 1/127* (2006.01)

(56) References Cited

U.S. PATENT DOCUMENTS

| | | | |
|---|---|---|---|
| 2004/0039632 A1* | 2/2004 | Han | G06Q 20/32 705/13 |
| 2007/0279283 A1 | 12/2007 | Flick | |
| 2009/0251333 A1 | 10/2009 | Itani | |
| 2010/0085214 A1* | 4/2010 | Kim | G08G 1/14 340/932.2 |
| 2013/0107053 A1* | 5/2013 | Ozaki | G01C 21/3602 348/148 |

FOREIGN PATENT DOCUMENTS

| | | |
|---|---|---|
| DE | 103 07 327 | 8/2004 |
| DE | 10310566 | 9/2004 |
| DE | 10 2004 043 177 | 11/2005 |
| DE | 10 2004043177 | 11/2005 |
| DE | 10 2008 034 230 | 2/2009 |
| DE | 10 2010 018 332 | 10/2011 |
| DE | 102010056529 | 7/2012 |
| DE | 10 2011 118 234 | 5/2013 |
| DE | 10 2011 101 359 | 11/2015 |
| EP | 2 088 569 | 8/2009 |
| EP | 2088569 | 8/2009 |
| FR | 2756 083 | 5/1998 |
| JP | 2001-221643 | 8/2001 |
| JP | 2002-230124 | 8/2002 |
| JP | 2003-85696 | 3/2003 |
| KR | 20130083087 | 7/2013 |

OTHER PUBLICATIONS

Chinese Search Report issued on Jul. 20, 2016 with respect to counterpart Chinese patent application 201480019551.0.
Translation of Chinese Search Report issued on Jul. 20, 2016 with respect to counterpart Chinese patent application 201480019551.0.

* cited by examiner

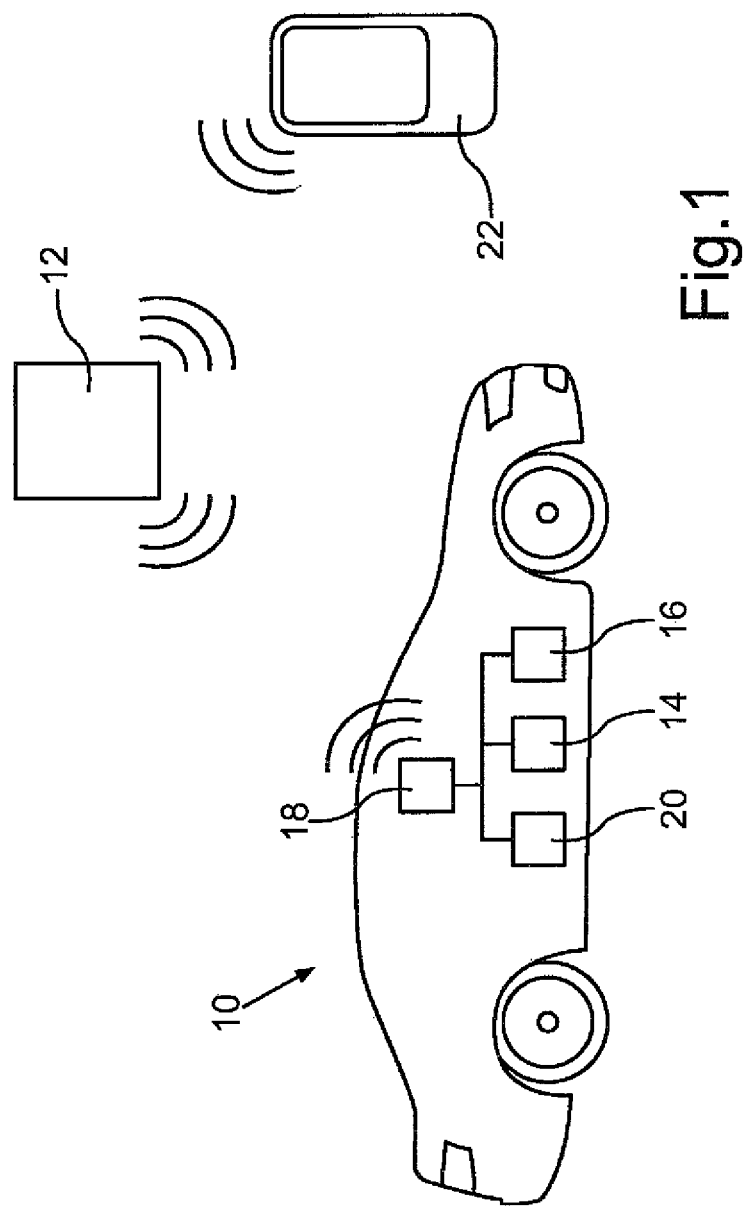

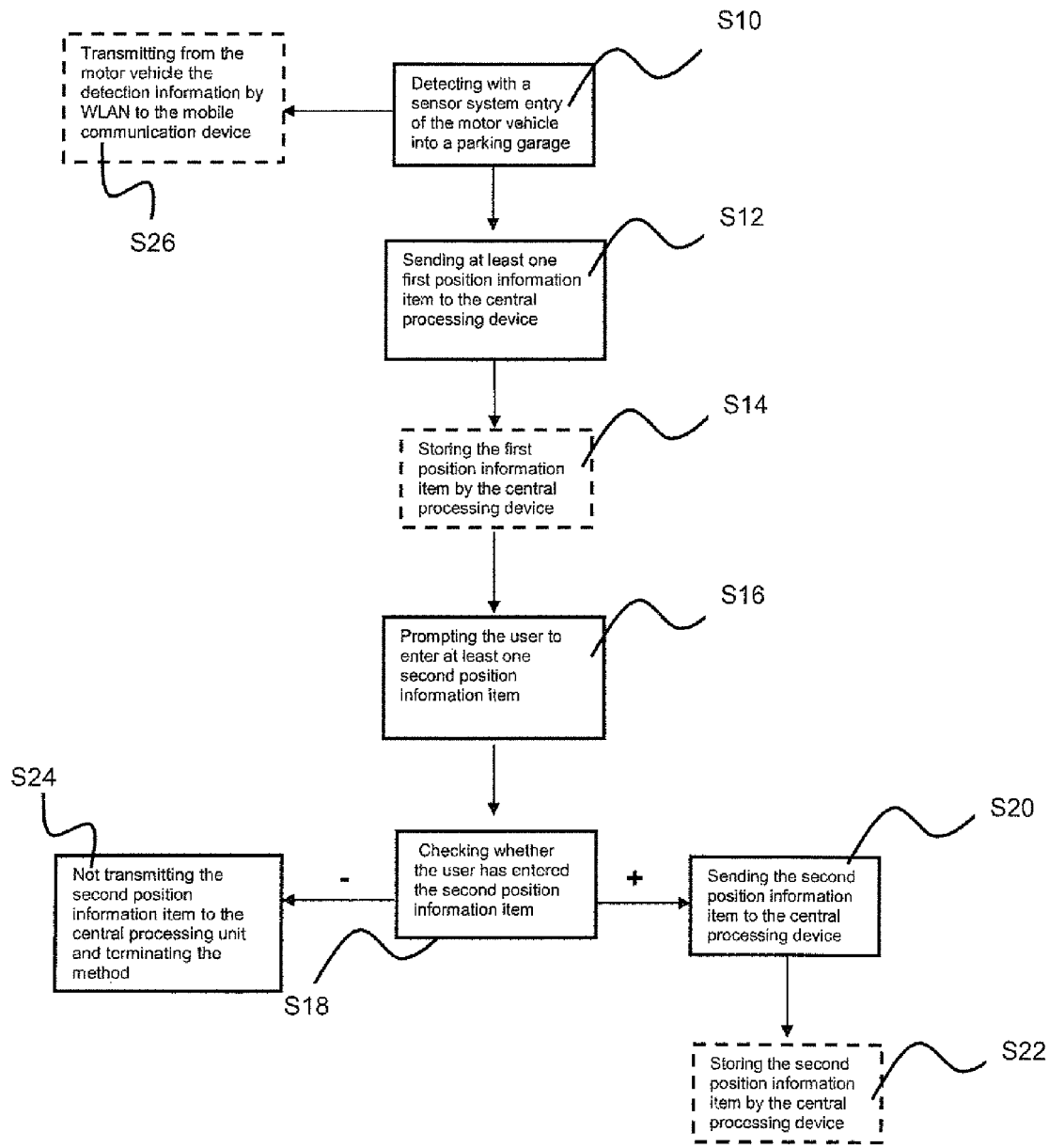

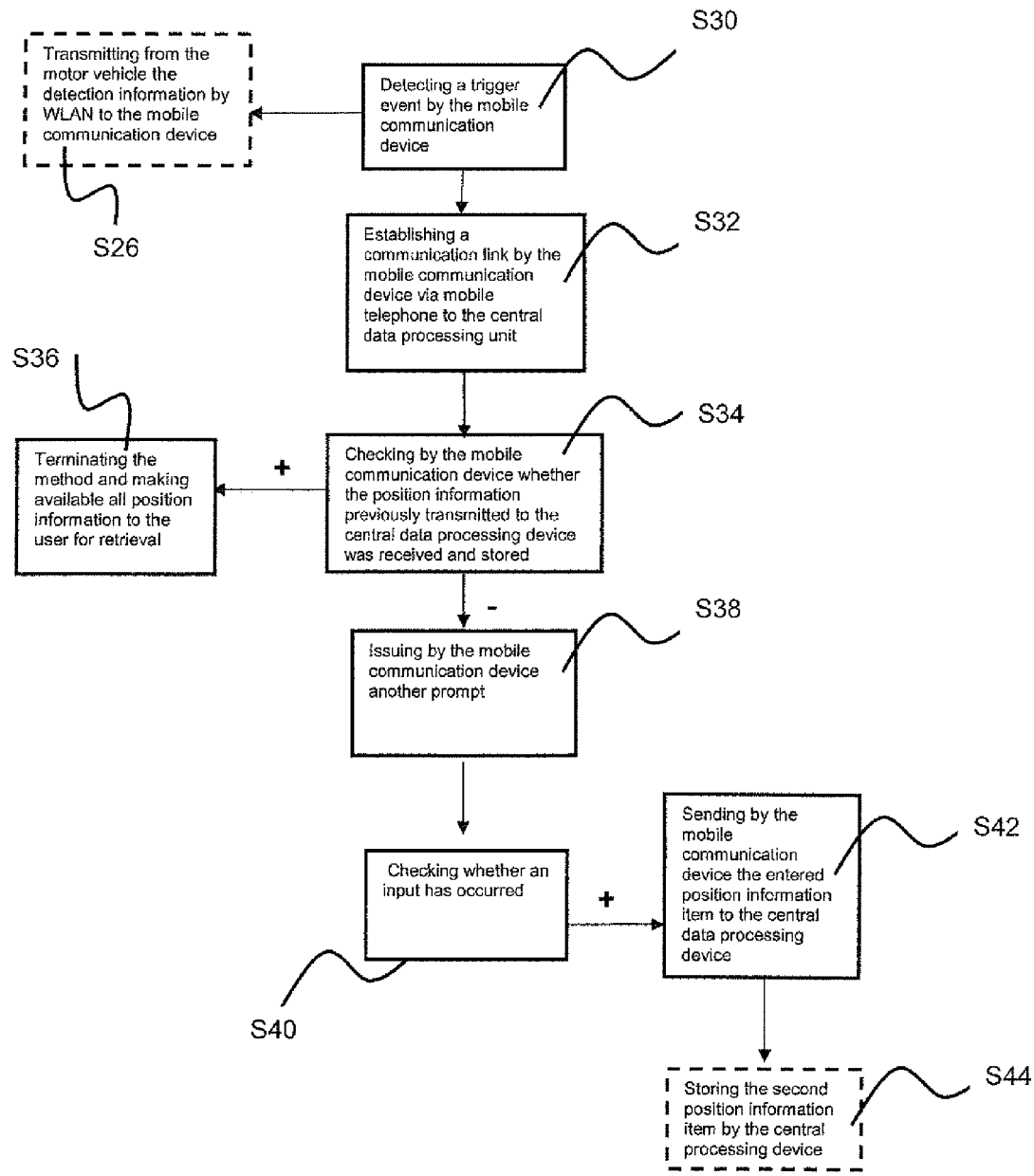

METHOD FOR MAKING AVAILABLE AT LEAST ONE POSITION INFORMATION ITEM ABOUT A PARKED MOTOR VEHICLE AND MOTOR VEHICLE

CROSS-REFERENCES TO RELATED APPLICATIONS

This application is the U.S. National Stage of International Application No. PCT/EP2014/002131, filed Aug. 1, 2014, which designated the United States and has been published as International Publication No. WO 2015/018513 and which claims the priority of German Patent Application, Serial No. 10 2013 013 329.7, filed Aug. 9, 2013, pursuant to 35 U.S.C. 119(a)-(d).

BACKGROUND OF THE INVENTION

The invention relates to a method for making available at least one position information item about a parked motor and to a motor vehicle configured to execute the method.

Today's systems—often referred to as Car Finder—allow the user to locate and save the position of his vehicle via his mobile phone. There are different manifestations, as to how this step is performed by the mobile phone. Some systems must be started manually by the user, while others use the sensor system of the mobile phone. The disadvantage hereby is that the systems rely only on the geo-coordinates of the mobile phone. If no geographic information is available, for example, in a large parking garage, no reliable parking reminder information can be generated. A problem occurs especially that when parking in parking garages, sufficient reception, for example for a GPS receiver, is not always available to determine the parking position. Moreover, parking garages are usually constructed with multiple levels, which additionally makes it more difficult to determine an accurate position and to find the vehicle.

DE 10 2004 043 177 A1 describes an arrangement for locating parked vehicles. The arrangement in this case includes a mobile phone with a navigation unit with a position determining unit. A parking detection circuit arranged in the vehicle hereby detects a parking situation and transmits the parking position provided by a GPS receiver to the mobile phone. The mobile phone can then guide the user from the current position of the mobile phone to the transmitted parking position of the vehicle. However, there is a problem even here that, especially when parking in a parking garage, the GPS reception is not always sufficient for determining the parking position.

Furthermore, EP 2088569 A1 describes a method for detecting and displaying parking-garage-relevant information. The information about the parking position of a vehicle in a parking garage can be stored in a mobile phone via RFID interaction. The mobile phone must be configured to enable RFID. Furthermore, a smart poster with an RFID label must installed at each parking space of a parking garage. Disadvantageously, however, not every parking garage has RFID labels at the parking positions, so that this method is only suitable for very few parking garages.

Furthermore, DE 10 2010 056 529 describes a generic method for providing a position information item of a parked motor vehicle. It is detected that the motor vehicle enters a parking garage and the current position is stored upon entry. The exact position of the vehicle in the parking garage is determined by onboard vehicle sensors to determine the distance. The position information is displayed after parking the vehicle. The parking level and the parking space number can also be listed, when the data are provided to a position detection module. The display can also occur on a mobile communication device that is connected with the vehicle via an interface.

SUMMARY OF THE INVENTION

It is therefore an object of the present invention to provide a method for providing at least one position information item about a parked motor vehicle and a motor vehicle, with which position information can be provided in a most reliable manner possible when parking in a parking garage.

This object is achieved by a method for providing at least one position information item about a parked vehicle, and by a vehicle according to the independent claims.

Advantageous embodiments of the invention are recited in the dependent claims.

In the method for providing at least one position information item about a parked motor vehicle according to the invention, a detection device of the motor vehicle detects that the motor vehicle enters a parking garage. Furthermore, when it has been detected that the motor vehicle has entered a parking garage, at least one first current position information item is sent by the motor vehicle to a vehicle-external central data processing facility device. Moreover, when the central data processing device receives the first position information item, the at least one first position information item is stored by the central data processing device.

By sending the first position information item at the same time when entering a parking garage, it becomes very likely that this position information item can also be successfully transmitted to the central data processing device, since the motor vehicle is, at the time of the transmission, still in an entry or entrance area of the parking garage, where the reception is usually sufficient for wireless transmission of the position information item to the central data processing device. The position information item can be transmitted to the central data processing device, for example via the Internet, in particular via WLAN. With the method according to the invention, the first position information item can particularly advantageously be made available to a user, regardless as to whether the user carries a mobile phone or smartphone, by storing the first positional information item on the vehicle-external central data processing device. For example, when a user does not carry or forgot his own mobile phone, he can retrieve the first position information item from another mobile phone when needed, or after his own mobile phone is again available. Furthermore, he can retrieve the information also from home from a home computer or a PDA, a Laptop, a Tablet PC, etc., in particular from any device that is capable of communicating with the central data processing device. Moreover, most advantageously, for example, a motor vehicle may be used by several persons. For example, a person who has not parked the vehicle and does not know where the vehicle is parked then retrieves the first position information item from the central data processing device using any device.

The first position information item may be provided in the form of geo-coordinates and may have been determined by the vehicle, for example by a GPS receiver. A GPS receiver is typically installed in each navigation device, so that this method also is particularly cost-effective since components already installed in a motor vehicle can usually be used. It can also be detected that the motor vehicle enters a parking garage, for example, from map data of a navigation device of the motor vehicle when the parking garage is marked on the map. This also enables a particularly cost-effective embodiment of the method. Alternatively or additionally, a corresponding sensor system may be provided on the motor vehicle for detecting when the motor vehicle enters a parking garage wherein, for example, sensors already installed in the motor vehicle can be used.

In an advantageous embodiment of the invention, in a further step, a prompt for inputting at least one second position information item is outputted by the motor vehicle to a user. Preferably, the user can input as the second position information a parking level and/or a parking spot number of the parking garage of the motor vehicle. Other types of position information about the parking location are also conceivable. Information about the exact location of the motor vehicle in the parking garage can thus be provided in a particularly simple, inexpensive and reliable manner.

In an advantageous embodiment of the invention, the at least one second position information item is sent in a further step to the central data processing device, if a user has entered the at least one second position information. Furthermore, the central data processing device can store the at least one second position information item, if the central data processing device has received the at least one second position information item. Thus, the second position information, in particular the exact location of the motor vehicle, can be provided for central retrieval, in particular again without requiring a mobile phone or smart phone from the user. Should the user nevertheless carry a mobile communication device, additional advantageous embodiments are available for providing more reliable position information about the motor vehicle.

For example, according to another embodiment, if a trigger event is detected by a mobile communication device, a communicative connection is established by the mobile communication device to the central data processing device. The trigger event may be a disconnection of a communication link between the mobile communication device and the motor vehicle, for example, a disconnection of hands-free equipment. The trigger event may also involve detection by the mobile communication device that the mobile communication device has been disconnected from the vehicle-mounted WLAN. These embodiments of the trigger event hereby presuppose a preexisting communicative coupling of the mobile communication device with the motor vehicle, which allows further advantageous embodiments.

The communicative connection between the mobile communications device and the central data processing device allows the further advantageous step of an embodiment of the invention, wherein the mobile communication device checks whether the first and the at least one second position information items were stored by the central data processing device. Advantageously, this verification step is automatically initiated by the trigger event and thus cannot be ignored by a user. In addition, this provides a particularly high reliability of the method, since it can thus be recognized whether all transmissions were successful. When this is not the case, corresponding additional advantageous steps can be taken.

In one embodiment of the invention, a prompt to enter the at least one second position information item can be outputted by the mobile communication device to the user, if the mobile communication device has determined that at least the at least one second position information item was not stored by the central data processing device. This gives the user another opportunity to enter the second position information item.

If the at least one second position information item is inputted by the user, then the at least one second position information item can be sent by the mobile communication device to the central data processing device. It is particularly advantageous that, for example, a type of communication link to the central data processing device can established with a mobile communication device, for example via the mobile phone network, that is different from the motor vehicle. This increases the probability that at least one of these communication links enable a successful reception. Another advantage is the fact that the mobile communication device is usually carried by the user when leaving the motor vehicle as well as the parking garage, so that a successful connection can be established by the mobile communication device no later than when leaving the parking garage. The exact position of the motor vehicle can hence be reliably stored by the central data processing device with very high probability.

As an alternative to the additional user input of the second position information item with the mobile communication device, in case a user has inputted in the motor vehicle at least one second position information item, this second position information item is transmitted by the motor vehicle to the mobile communication device. This can be accomplished, for example, by advantageously using the communicative coupling between the motor vehicle and the mobile communication device for providing the aforementioned trigger event. Furthermore, the at least one second position information item transmitted to the mobile communications device can be sent by the mobile communication device to the central data processing device, if the mobile communication device has determined during the verification that at least the at least one second position information item was not stored by the central data processing device. Advantageously, the user then does not have to enter again the second position information item.

The motor vehicle according to the invention includes a position determination device which is configured to determine a current position information item of the motor vehicle, a detection device which is configured to detect whether the motor vehicle enters a parking garage, and a communication device. The communication device is coupled to the detection device and to the position determining device. Furthermore, the communication device is configured to establish a communication link to a vehicle-external central data processing device and to initiate transmission of a current first position information item to the central data processing device upon detection that the motor vehicle enters a parking garage.

The features described for the method according to the invention and its embodiments enable improvements of the motor vehicle according to the invention by way of other characteristic features, wherein in particular the described method steps relating to the motor vehicle imply the device means for performing these steps. Furthermore, the features and feature combinations and their advantages mentioned in conjunction with the method of the invention and its embodiments also apply, when applicable, to the motor vehicle according to the invention.

Additional advantages, features and details of the invention can be derived from the claims, the following description of preferred embodiments and from the drawings.

BRIEF DESCRIPTION OF THE DRAWING

Preferred embodiments of the invention will now be described in detail with respect to the drawing, which shows in:

FIG. 1 a schematic diagram of a motor vehicle according to an exemplary embodiment of the invention for providing a position information item to a central data processing device;

FIG. 2 a schematic illustration of a flow diagram illustrating method steps according to an exemplary embodiment of the invention; and FIG. 3 a schematic illustration of a flow diagram illustrating further method steps according to an exemplary embodiment of the invention.

DETAILED DESCRIPTION OF PREFERRED EMBODIMENTS

FIG. 1 shows a schematic diagram of a motor vehicle 10 according to an exemplary embodiment of the invention for providing position information to a central data processing device 12. To provide the position information, the motor vehicle 10 has a position-determining device 14, such as a GPS receiver. The GPS receiver can also be part of a navigation device. As long as adequate GPS reception is available, position information, for example in the form of geographic coordinates, may be provided periodically or upon request or by a predetermined event by the position-determining device 14 in the motor vehicle 10. Furthermore, the motor vehicle 10 has a detection device 16 which is configured to detect that the motor vehicle 10 enters a parking garage. When the detection device 16 detects that the motor vehicle 10 enters a parking garage, a communication device 18 of the motor vehicle 10 sends the current position provided by the position-determining device 14 to a central data processing device 12. The position information may be transmitted to the central data processing device 12, for example via Internet, in particular WLAN. The communication device 18 is configured to establish a communication link, in particular an Internet connection, to the central data processing device 12. Furthermore, for example, an address of the central data processing device 12 may be provided in the automobile 10, for example stored in a memory. The communication device 18 can then access the address and send the geo-coordinates to the central data processing device 12. The communication device 18 is further configured to transmit the geo-coordinates immediately after detecting entry into the parking garage, so that the motor vehicle 10 is during the transmission of the geo-coordinates still in an entrance or entry area of the parking garage, thereby being able to transmit the geo-coordinates successfully to the central data processing device 12 with high probability. The position is also determined by the position-determining device 14 no later than immediately after detecting entry into a parking garage. The position information can thus be provided as reliably as possible as geo-coordinates to a central data processing device 12, stored and retrieved by a user at any time.

The motor vehicle 10 furthermore includes an output and input device 20. This device is configured to prompt the user, in response to detecting an entry into a parking garage, to enter a further position information item, such as a parking level and/or a parking space number. The prompt can be made via a speech dialog or a pop-up in the vehicle's MMI. The user can then, especially after parking the motor vehicle 10, enter via the input device 20 the parking level and/or the parking space number. After an input is made by the user, the communication device 18 sends this additional position information item again to the central data processing device 12. If a transmission of the additional positional information item is possible, the additional position information item can then be provided to the central data processing device 12, stored and retrieved by a user at any time.

Any kind of device that is capable of communication with the central data processing means 12 can advantageously be used to retrieve the position information stored by the centralized data processing device 12. For example, a user can use his mobile phone or smartphone, and if such device is not available, he can retrieve the position information from another mobile communication device or even from home, from a home computer or a laptop, PDA, Tablet PC, etc.

If a mobile communication device 22 is available to the user, it can advantageously be included in the method in order to make the position information available in a more reliable manner. Since transmission of the parking level or parking space number entered by the user may not always be successful in a parking garage due to poor reception, a mobile communication device 22 is preferably designed to establish a communication link with the central data processing device 12 after a trigger event and to query the central data processing device 12 whether the position information, i.e. the geo-coordinates or the parking level and parking space number were successfully transmitted and stored. The trigger event may be, for example, the disconnection of a communication link between the mobile communication device 22 and the vehicle 10, for example disconnection of a hands-free device. For example, the mobile communication device 22 also recognizes when the connection to the vehicle-side WLAN is disconnected, which happens in particular when the ignition of the motor vehicle 10 is turned off. This recognition can also serve as a trigger event. For this to happen, any type of communicative link must previously have existed between the mobile communication device 22 and the motor vehicle 10, and/or the mobile communication device 22 must previously have been connected to the vehicle-side WLAN, preferably already before entering a parking garage or prior to the detection of entry into a parking garage. Information that entry into a parking garage was detected can also be transmitted the mobile communication device 22 via this connection, so that an attempt to access the position information from the central data processing device 12 is advantageously only made when the motor vehicle 10 has actually entered a parking garage. The communication link between the mobile communication device 22 and the central data processing device 12 can continue to be implemented as a cellular connection, telecommunications connection or via WLAN.

Here, the mobile communication device 22 establishes the communication link to the central data processing device 12 as soon as possible, i.e. as soon as a corresponding mobile network or WLAN access is available. The mobile communication device 22 may repeatedly attempt to establish the communication link until being successful or cancel the attempt after a predetermined period of time or number of unsuccessful connection attempts. However, even when there is poor reception or no reception at all in a parking garage, a communication link with the central data processing device 12 can usually be established by the user with the mobile communication device 22, at the latest when leaving the parking garage.

If the mobile communication device 22 finally determines during this query that, for example, the parking level and parking space number are not available on the central data processing device 12, then the mobile communication device 22 prompts the user to enter the additional position information item, such as the parking level and parking space number. This gives the user another chance to enter these data. The entered position information item can then be transmitted again from the mobile communication device 22 to the central data processing device 12 and stored by the latter. The data can also be stored in the mobile communication device 22 itself; storing the data on a central data processing device 12 is particularly advantageous, since the data can then be retrieved at any time from any device, such as another mobile communication device 22, Internet-enabled computer, etc.

FIG. 2 shows a schematic illustration of a flow diagram illustrating method steps according to an exemplary embodiment of the invention. In particular, foremost all the method steps carried out by the motor vehicle 10 for providing position information are illustrated. The method starts at step S10, wherein entry of the motor vehicle 10 into a parking garage is detected by a detection device 16 of the motor vehicle 10. The vehicle 10 then sends, at step S12, at least one first current position information item to the central data processing device 12. The position information may be present in the form of geo-coordinates and/or GPS coordinates and may have been provided by a GPS receiver or another position determination device 14 of the motor vehicle 10. The position information can be determined repeatedly at periodic intervals by the motor vehicle 10 independently of the execution of the method, e.g. for the purpose of navigation. After detecting entry into a parking garage, the current present position information item can then be sent to the central data processing device 12. Alternatively, the current position can also be determined by the motor vehicle 10 only after entry into a parking garage has been detected. In particular, the position can be determined immediately upon entry, or the detection of the entry can simultaneously trigger the detection method. Thus, it is very likely that the position of the vehicle 10 can be successfully determined because GPS reception is still good at the entrance of a parking garage standing. The same applies to sending the first position information item to the central data processing device 12. This, too, takes place immediately after the detection of the entry into the parking garage or immediately after detecting the current position information item by the motor vehicle 10, if the position information is not yet available in the motor vehicle 10.

When the central data processing device 12 receives the first position information item, the first position information item is stored by the central data processing device at the optional step S14. This step S14 is optional to the extent that the first position information item cannot be stored by the central data processing device 12 when the first position information item was not received.

At the next step S16, the motor vehicle 10 prompts the user to enter at least one second position information item, in particular a parking level and/or a parking space number. At the next step S18 it is checked whether the user has entered the second position information item. If this is the case, then the entered second position information item is sent to the central data processing device 12 at a further step S20 and the second position information item is stored by the central data processing device 12 at the optional step S22. Optional in this context again indicates only a situation where the second position information item was actually received by the central data processing device 12.

Conversely, if it is determined at step S18 that a user did not enter information relating to the second position information item, then the second position information item can also not be transmitted to the central data processing device 12 and the method is terminated on the vehicle side at step S24.

If all position information could be successfully transmitted to the central data processing device 12, then this information is readily available to a user at any time for retrieval without the need to carry a mobile communication device 22. However, the integration of a mobile communication device 22 in this method has significant benefits especially when parking in a parking garage, because adequate reception is not always guaranteed. This will be illustrated by the additional method steps in FIG. 2.

FIG. 3 shows a schematic illustration of a flow chart for illustrating additional method steps in accordance with an exemplary embodiment of the invention. In this case, a trigger event is detected by the mobile communication device 22 at step S30. As already described, this event can be, for example, disconnection of the mobile communication device 22 from the on-board WLAN. However, since the steps are especially useful when parking in a parking garage, an additional condition for initiating the additional method steps may be provided in addition to the trigger event, such as the detection of the entry of the vehicle 10 into a parking garage. When this event is detected, for example, at step S10, as described at FIG. 1, this detection information can be transmitted at a step S26 from the motor vehicle 10, for example by the vehicle-side WLAN, to the mobile communication device 22.

Thus, when the mobile communication device 22 detects the trigger event, the mobile communication device 22 establishes at step S32 a communication link, for example via a mobile telephone, to the central data processing device 12, either immediately or at the latest when reception is adequate for establishing this connection. At step S34, the mobile communication device 22 checks whether the position information previously transmitted to the central data processing device 12 was received and stored by the central data processing device 12. If this is the case, then the method is terminated at step S36 and all position information is reliably available to the user for retrieval.

If this is not the case, then the mobile communication device 22 may issue another prompt to the user at step S38. Thus, the user is automatically alerted to the fact that not all the position information could be stored. The user can now re-enter e.g. the parking levels and the parking space number. At step S40, the mobile communication device 22 then checks whether an input has occurred, and if this is the case, the mobile communication device 22 sends, at step S42, the entered position information item to the central data processing device 12. It is assumed here with very high probability that the transmission of this information to the central data processing device 12 was successful, so that the central data processing device 12 can store the transmitted position information item at step S44. As an alternative to a re-entered user input with the mobile communication device 22, the input position information may also be automatically transmitted to the mobile communication device 22, when the user inputs data in the vehicle 10. If it is then determined during checking at step S34 that this position information item was not stored in the central data processing device 12, then the mobile communication device 22 can automatically send this position information item to the central data processing device 12.

This method, in particular storing the position information on a central vehicle-external data processing device, advantageously enables position information to be provided universally for retrieval, especially without the need to carry a cell phone at the time of parking. The function is thus independent of a cell phone or a smartphone. The user can also enter his parking information in the vehicle and later view the parking information at any time at the customer portal from any Internet-enabled device.

Furthermore, the user is not required to manually start the function, but is automatically advised by the vehicle—and secondly by the mobile communication device.

In addition, the hybrid structure of the method, wherein the functions of the motor vehicle and of the mobile communication device are used, provides particularly reliably position information about the parked motor vehicle, in particular even its exact location including parking level and parking space number, which is particularly advantageous when parking in parking garages.

The invention claimed is:

1. A method for providing at least one position information item about a parked motor vehicle, wherein the motor vehicle comprises a communication device and a position-determining device, the method comprising:
    a1) detecting with a sensor system entry of the motor vehicle into a parking garage;
    a2) determining with the position-determining device of the motor vehicle, at least one current first position information item of the motor vehicle as geo-coordinates or GPS coordinates;
    b) upon detecting the entry of the motor vehicle into a parking garage, triggering transmission of the at least one current first position information item provided by the position-determining device of the motor vehicle to a vehicle-external central data processing device via the communication device of the motor vehicle; and
    c) upon receipt of the at least one current first position information item by the central data processing device, storing the at least one first position information item by the central data processing device.

2. The method of claim 1, further comprising:
    d) outputting by the motor vehicle to a user a prompt for entering at least one second position information item.

3. The method of claim 2, further comprising:
    e) when after step d), the at least one second position information item is entered by a user, sending the at least one second position information item to the central data processing device.

4. The method of claim 3, further comprising:
    f) when the central data processing device receives the at least one second position information item, storing the at least one second position information item by the central data processing facility.

5. The method of claim 1, further comprising:
    g) detecting a trigger event with a mobile communication device, and in response establishing with the mobile communication device a communication link to the central data processing device.

6. The method of claim 5, further comprising:
    h) checking with the mobile communication device, whether the at least one current first position information item and the at least one second position information item were stored by the central data processing device, by establishing with the mobile communication device after the trigger event the communication link to the central data processing device and querying the central data processing device, whether the at least one current first position information item and the at least one second position information item were transmitted and stored by the central data processing device.

7. The method of claim 6, further comprising:
    i) when it is determined by the mobile communication device at step h) that at least the at least one second position information item was not stored by the central data processing device, outputting with the mobile communication device to the user a prompt for inputting the at least one second position information item.

8. The method of claim 7, further comprising:
    j) when after step i), the at least one second position information item is inputted by the user, transmitting with the mobile communication device the at least one second position information item to the central data processing device.

9. The method of claim 6, further comprising:
    k) when after step d), the at least one second position information item is inputted by a user, transmitting with the motor vehicle the at least one second position information item to the mobile communication device; and
    l) when at step h), it is determined by the mobile communication device that at least the at least one second position information was not stored by the central data processing device, transmitting with the mobile communication device the at least a second position information item to the central data processing device.

10. A motor vehicle comprising:
    a sensor system configured to detect the entry of the motor vehicle into a parking garage,
    a position determination device configured to determine a current first position information item of the motor vehicle,
    a detection device configured to detect an entry of the motor vehicle into a parking garage,
    a communication device,
    wherein the communication device is coupled with the detection device, sensor system and the position determining device and is configured to establish a communication link to a vehicle-external central data processing device, and
    wherein the communication device is further configured to initiate, upon detection of an entry of the motor vehicle into a parking garage, transmission of the current first position information item to the central data processing device.

* * * * *